Figure 1:
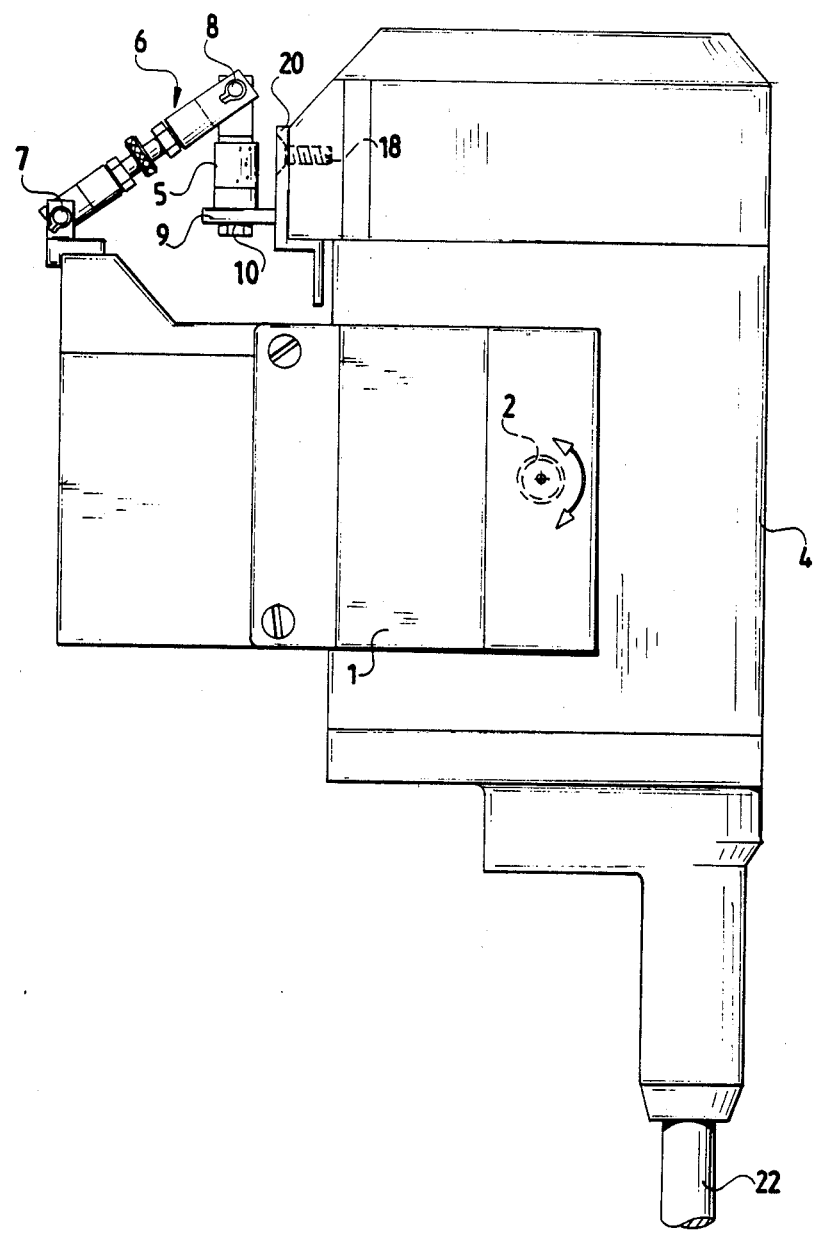

United States Patent [19]

Hoepf

[11] Patent Number: 4,946,146
[45] Date of Patent: Aug. 7, 1990

[54] HOLDING DEVICE, IN PARTICULAR, FOR TOOLS OR WORKPIECES FOR INDUSTRIAL ROBOTS

[75] Inventor: Michael Hoepf, Stuttgart, Fed. Rep. of Germany

[73] Assignee: C & E Fein GmbH & Co., Stuttgart, Fed. Rep. of Germany

[21] Appl. No.: 276,444
[22] PCT Filed: Mar. 25, 1988
[86] PCT No.: PCT/DE88/00191
    § 371 Date: Nov. 21, 1988
    § 102(e) Date: Nov. 21, 1988
[87] PCT Pub. No.: WO88/07440
    PCT Pub. Date: Oct. 6, 1988

[30] Foreign Application Priority Data

Mar. 28, 1987 [DE] Fed. Rep. of Germany ....... 3710381

[51] Int. Cl.$^5$ ............................................. F16F 1/52
[52] U.S. Cl. .................................. 267/137; 267/141; 267/153
[58] Field of Search ............... 267/136, 137, 141, 150, 267/153, 160

[56] References Cited

U.S. PATENT DOCUMENTS

| 144,058 | 10/1873 | Butterfield | 267/137 X |
| 2,402,400 | 6/1946 | Hewitt et al. | 267/150 X |
| 2,583,948 | 1/1952 | Keetch | 267/153 X |
| 2,987,291 | 6/1961 | Dyson | 267/153 X |
| 3,861,517 | 1/1975 | Theijsmeijer | 267/137 X |
| 4,327,496 | 5/1982 | Rebman | 33/180 R |

FOREIGN PATENT DOCUMENTS

| 3407624 | 4/1987 | Fed. Rep. of Germany . |
| 0090737 | 7/1980 | Japan ................................. 267/141 |

Primary Examiner—Duane A. Reger
Attorney, Agent, or Firm—Kramer, Brufsky & Cifelli

[57] ABSTRACT

In a holding device with a receiving part held on a holder by means of a linear and/or rotary guide means, in particular, for tools for industrial robots, wherein the motion of the receiving part relative to the holder can be damped by means of a restoring damping element which can be subjected to tensile and shear stresses, in order to provide by virtue of a simple arrangement both damping of the motion of the receiving part relative to the holder and a restoring force which ensures reliable maintenance of the middle position, it is proposed that the damping element be arranged so as to be structurally separate from the guide means for the linear and/or rotary motion and that deflection forces acting upon the damping element during motion of the receiving part relative to the holder be exerted essentially perpendicular to its direction of tension.

17 Claims, 3 Drawing Sheets

HOLDING DEVICE, IN PARTICULAR, FOR TOOLS OR WORKPIECES FOR INDUSTRIAL ROBOTS

The invention relates to a holding device with a receiving part held on a holder by means of a linear and/or rotary guide means, in particular, for tools for industrial robots, wherein the motion of the receiving part relative to the holder can be damped by means of a restoring damping element.

Devices of theis kind are used, in particular, for flexibly mounting tools for industrial robots. With such holding devices, on the one hand, the machining force is absorbed by the tool mounting and, on the other hand; uncoupled from the industrial robot itself. The clamping of workspieces to be machined often diverges from an ideal clamping, as does the path of motion of the tools guided by handling apparatus.

In the cases where the workpiece clamping and/or tool guidance diverges from the ideal case, too, linear and/or rotary guide means permit machining of superior quality without the deviations from the ideal case having to be taken into consideration in the programming of the handling apparatus or industrial robots.

It is thereby possible to improve the machining quality and to greatly reduce the programming expenditure for the manufacturing sequence.

In this case, it is advantageous that the direction of deflection of the tool may be structurally fixed by the mounting of the receiving part, whereby the machining forces which do not have a component in the direction of deflection of the receiving part cannot cause undesired motion of the tool. This does, however, often require the direction of flexibility to be such that deflection from a middle position in two directions forming an angle of 280 degrees is possible. It is known to utilize compressed air cylinders or springs for this purpose and to make use of their restoring action in the direction of tension. These known constructions have the disadvantage that their damping behavior is very unsatisfactory, particularly in the case of small restoring forces as required, for example, for removing the burrs from non-ferrous metals, since there is hardly any damping action in this case (particularly with mechanical springs) or the friction does not ensure reliable setting of the middle poition of the receiving part relative to the holder.

Reliable maintenance of a middle position in the known assemblies is also not possible. Use of rubber spring elements instead of mechanical springs or compressed air cylinders offers no solution because tensile stresses result in only short service lives of the rubber spring elements.

The object of the invention is to provide a holding device of the generic kind which by virtue of a simple arrangement can provide both a damping of the motion of the receiving part relative to the holder and a restoring force which enables reliable maintenance of the middle position.

This object is achieved, in accordance with the invention, in the holding device described at the beginning in that the damping element can be subjected to tensile and shear stresses, in that the damping element is arranged so as to be structurally separate from the guide means for the linear and/or rotary motion and in that during motion of the receiving part relative to the holder deflection forces acting upon the damping element are exertable essentially perpendicular to its direction of tension.

The separation of guide means and damping means results firstly in the advantage that the damping element is easily exchangeable independently of the mounting of the receiving part, which, secondly, results in the possibility of adapting the damping effect and also the spring action of the damping element to the different conditions under which the device is to be used. In addition, the easy exchangeability of the damping element increases the serviceability of the inventive device, i.e.; worn damping elements may be quickly exchanged and so the device only has to be taken out of the production sequence for a short time.

The component of the tensile force in the deflection forces acting on the damping element should, in general, not exceed 50%.

The tensile force component is preferably kept under 25%.

The inventive device may not only be used with advantage for holding tools but, in a similar way, also in workpiece transporting devices where by virtue of the movable mounting of the receiving part which, in this case, holds a gripper, larger tolerances can be permitted in the positioning of the workpieces supplied for the production process, for example, on pallets.

Exertion of the forces in accordance with the invention results, above all, in the damping element being subjected to shear stress instead of the hitherto customary tensile stress. This enables, on the one hand, use of damping elements which as a result of pure tensile stress would have only a short service life and, on the other hand, utilization of damping elements which have different constants of elasticity and/or damping effects with respect to tensile and shear stresses and, therefore, depending on the choice of direction in which the deflection forces are exerted on the damping element, damping of different hardness or softness and restoring forces of different size are obtained.

The damping element is preferably made of elastic material. Such damping elements have the great advantage that the spring action with the restoring force and the damping effect can be united in one component which, in the simplest case, consists of a cylindrical or block-shaped body of elastic material.

Advantageous elastic materials are elastomers or also rubber which are used in various hardnesses depending on the desired spring action and damping effect.

In particular, if rubber is used as elastic material, it is recommended to keep the tensile force component of the deflection forces acting upon the damping element under 15%, in which case the damping elements have a significantly longer service life.

In particularly advantageous holding devices, the damping element is formed by a rubber spring element. The deflection forces are preferably exerted on the one end of the damping element through a connecting arm articulated with the latter and with the receiving part or the holder, and the damping element is fixed with respect to its direction of traction at its other end to the holder and the receiving part, respectively.

Expediently, the damping element is mounted with respect to its direction of tension essentially perpendicular to the direction of linear motion of the receiving part so that a pure shear force acts upon the damping element during linear motion of the receiving part form its middle position.

The rotary motion of the receiving part towards the holder is expediently limited to a certain angular range by stops. This ensures that the perpendicular orientation of the direction of tension of the damping element with respect to the direction of linear motion is always substantially maintained even if the damping element is fixed to the receiving part and, therefore, the direction of traction changes its orientation with respect to the direction of linear motion during rotation of the receiving part.

The connecting arm is preferably articulated with the damping element at an angle of approximately 45 degrees to the direction of traction.

In a preferred embodiment, the length of the connecting arm is settable and so the middle position of the receiving part is adjustable by means of the change in length of the connecting arm.

An advantageous possibility of adapting the restoring forces and of setting optimal damping conditions consists inn arranging the damping element between exchangeable adapter members.

A holding device for movably mounting a receiving part, in particular, a tool receiving part for industrial robots which is arranged for longitudinal or rotational motion with the interposition of a resilient damping means and which is mounted in a holder by means of a linear or rotary guide means is preferably designed such that a rubber spring element is disposed between receiving part and holder in the plane of motion of the receiving part, with a connecting arm which extends from the holder engaging one end of the rubber spring element and its points of engagement each being in the form of articulated connections, and with the other end of the rubber element being connected to the receiving part in such a way that during deflection of the receiving part, essentially a shear stress acts upon the rubber spring element and a minimal tensile stress is applied to the rubber spring element through the articulatedly supported connecting arm.

As a result of this exertion of the forces, a shear stress is applied to the rubber spring element and by virtue of the movability of the connecting arm in the articulated connections upon displacement of the point of engagement of the receiving part, the rubber spring element adjusts to correspondingly low tensile stress. In addition. there is the advantage that the existing elasticity of the rubber spring elements in the case of shear stress may be exploited. These advantages may also be used in a middle position of the receiving part and in the case of bidirectional defleciton.

An expedient configuration is produced by the deflection forces originating from the receiving part acting approximately at a right angle on the rubber spring element.

To advantageously set the rubber spring element in the case of deflection by the receiving part, it is suggested that the connecting arm engage the rubber spring element approximately at an angle of 45 degrees.

For simple setting and adjustment of the assembly, it is suggested that the connecting arm be adjustable in length.

In order to set different restoring forces and the damping conditions, provision is made for the rubber spring element to be arranged between exchangeable adapter members.

Figure 2:
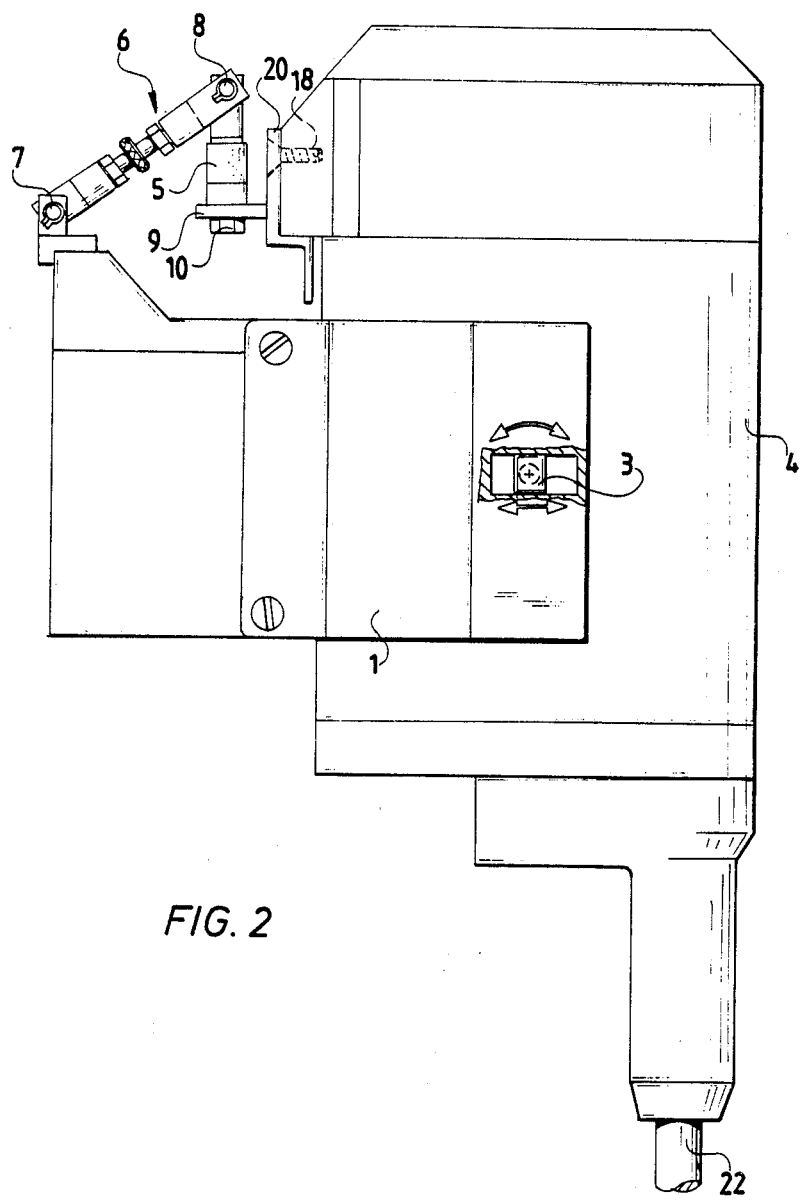
Figure 3:
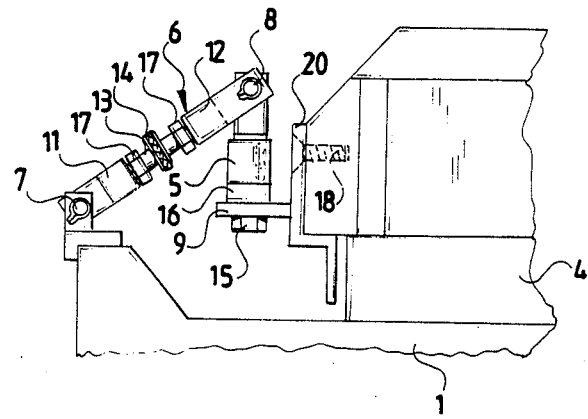
Figure 4:
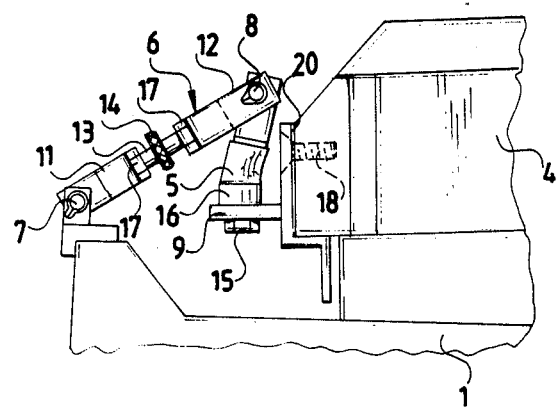
Figure 5:
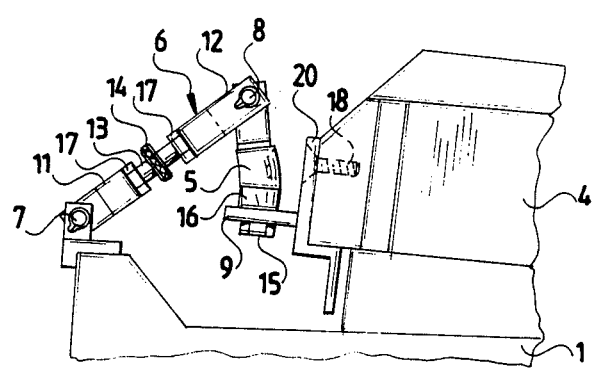

Embodiments of the invention are illustrated schematically in the drawings which show:

FIG. 1. a view of an inventive holding device with a rotationally movable tool receiving means, FIG. 2. an assembly with linear and rotationally movable guidance of the tool receiving means, FIGS. 3 to 5 detail illustrations with rubber spring elements in a middle position and deflected positions when a tool receiving means rotates.

In the illustrated devices, a holder 1 which is connected to a robot arm, not illustrated in detail, is joined by means of a pivot bearing 2 or a longitudinal guide means 3 to a tool receiving part 4. Hence this tool receiving part 4 is movably adjustable relative to the holder 1.

In FIG. 1, the tool receiving part 4 holds a tool shank 22. In addition, a rubber spring element 5 is arranged in the plane of motion of the tool receivng part 4 between the holder 1 and the tool receiving part 4. One end of the rubber spring element 5 is connected to the holder 1 by means of a connecting arm 6 and the two points of engagement of the connecting arm 6 are formed by hinge connections 7, 8. In the middle position of the tool receiving part 4, the connecting arm 6 and the rubber spring element 5 are arranged at an angle of approximately 45 degrees to one another. The other end of the rubber spring element 5 is connected at attachment point 10 to the tool receiving part 4 by means of a connection piece 9. This connection piece 9 is designed in such a way that the deflection forces originating from the tool receiving part 4 act approximately at a right angle on the rubber spring element 5. The connection piece 9 is secured to a mounting plate 20 which is screwed (screw 18) to the receiving part.

Upon rotational and/or sliding displacement of the tool receiving part 4, the attachment point 10 is shifted by shearing stress being applied to the rubber spring element 5 and by virtue of the connection of the connecting arm 6 to the rubber spring element 5, only a low tensile stres can be applied thereto.

To enable adjustment and setting of a middle position, the connecting arm 6 is comprised of individual elements 11 and 12 which are adjustably connected by means of a left-hand/right-hand threaded rod 13 with an associated knurling wheel 14. The setting is fixed by means of counter nuts 17.

The rubber spring element 5 is attached to the hinge connection 8 of the connecting arm 6 by means of an internal thread whereas the other side is fixed by means of an external thread and a nut 15. This enables easy exchange of the rubber spring element 5 without changing the setting. Use of spacer rings 16 furthermore enables rubber spring elements 5 of different lengths and diameters to be employed. The restoring forces and the damping behavior can thereby be adapted to the requirements in a very simple manner.

I claim:

1. Holding device for a tool, comprising:
   a holder;
   a receiving part for said tool;
   a guide means connected with said holder and said receiving part and allowing said receiving part linear and/or rotary motion with respect to said holder;
   a damping element arranged so as to be structurally separate from said guide means;
   said damping element being designed to maintain said receiving part in a distinct middle position with respect to said holder and being arranged between said receiving part and said holder such that during motion of the receiving part away from said distinct position deflection forces acting on said damping element are exertable essentially perpendicular to the direction of tension.

2. Holding device as defined in claim 1, characterized in that the damping element is made of elastic material.

3. Holding device as defined in claim 1, characterized in that the elastic material consists of an elastomer or rubber.

4. Holding device as defined in claim 3, characterized in that the damping element is a rubber spring element.

5. Holding device as defined in claim 1, characterized in that the deflection forces are exertable on one end of the damping element through a connecting arm articulated with the latter and with the receiving part or with the holder, and the damping element is fixed with respect to its direction of tension at its other end to the holder and the receiving part, respectively.

6. Holding device as defined in claim 1, characterized in that the damping element is mounted with respect to its direction of tension substantially perpendicular to the direction of linear motion of the receiving part.

7. Holding device as defined in claim 5, characterized in that the position of rest, the connecting arm is articulated with the damping element at an angle of approximately 45 degrees to the direction of tension.

8. Holding device as defined in claim 5, characterized in that the connecting arm is adjustable in length.

9. Holding device as defined in claim 3, characterized in that the damping element is arranged between adapter members.

10. Holding device for movably mounting a receiving part, in particular, a tool receiving part for industrial robots which is arrnged for longitudinal or rotational motion with the interposition of a resilient damping means and which is mounted in a holder by means of a linear or rotary guide means, characterized in that a rubberr spring element is disposed between receiving part and holder in the plane of motion of the receiving part, with a connecting arm which extends from the holder engaging one end of the rubber spring element and its points of engagement each being in the form of articulated connections, and with the other end of the rubber element being connected to the receiving part in such a way that during deflection of the receiving part essentially a shear stress acts upon the rubber spring element and a minimal tensile stress is applied to the rubber spring element through the articulatedly supported connecting arm.

11. Holding device as defined in claim 3, characterized in that the deflection forces originating from the receiving part act upon the rubber spring element approximately at a right angle.

12. Holding device as defined in claim 9, characterized in that the connecting arm is articulatedly connected with the rubber spring element at an angle of approximately 45 degrees.

13. Holding device as defined in claim 1, characterized in that the connecting arm is adjustable in length.

14. Holding device as defined in claim 3, characterized in that the rubber spring element is arranged between exchangeable adapter members.

15. Holding device as defined in claim 10, characterized in that the connecting arm (6) is adjustable in length.

16. Holding device as defined in claim 10, characterized in that the rubber spring element (5) is arranged between exchangeable adapter members (8).

17. Holding device for a tool for an industrial robot, comprising:
    a holder connected to a robot arm;
    a receiving part for said tool;
    a guide means connected with said holder and said receiving part and allowing said receiving part linear and/or rotary motion with respect to said holder;
    a damping elemlent arranged so as to be structurally separate from said guide means;
    said damping element being designed to maintain said receiving part in a distinct middle position with respect to said holder and being arranged between said receiving part and said holder such that during motion of the receiving part away from said distinct position deflection forces acting on said damping element are exertable essentially perpendicular to the direction of tension.

* * * * *

UNITED STATES PATENT AND TRADEMARK OFFICE
CERTIFICATE OF CORRECTION

PATENT NO. : 4,946,146

DATED : August 7, 1990

INVENTOR(S) : Michael Hoepf

It is certified that error appears in the above-identified patent and that said Letters Patent is hereby corrected as shown below:

Column 5, in claim 10, line 38, the word "rubberr" should be

-- rubber --.

Signed and Sealed this

Twentieth Day of August, 1991

Attest:

HARRY F. MANBECK, JR.

*Attesting Officer*     *Commissioner of Patents and Trademarks*